United States Patent
Jeong et al.

(10) Patent No.: US 10,853,966 B2
(45) Date of Patent: Dec. 1, 2020

(54) VIRTUAL SPACE MOVING APPARATUS AND METHOD

(71) Applicant: Samsung Electronics Co., Ltd., Gyeonggi-do (KR)

(72) Inventors: Moon-Sik Jeong, Gyeonggi-do (KR); Ivan Koryakovskiy, Gyeonggi-do (KR); Sang-Keun Jung, Gyeonggi-do (KR); Kumar Nipun, Gyeonggi-do (KR)

(73) Assignee: Samsung Electronics Co., Ltd

( * ) Notice: Subject to any disclaimer, the term of this patent is extended or adjusted under 35 U.S.C. 154(b) by 81 days.

(21) Appl. No.: 15/901,299

(22) Filed: Feb. 21, 2018

(65) Prior Publication Data

US 2018/0173302 A1 Jun. 21, 2018

Related U.S. Application Data

(63) Continuation of application No. 13/739,693, filed on Jan. 11, 2013, now abandoned.

(30) Foreign Application Priority Data

Jan. 11, 2012 (KR) ........................ 10-2012-0003432

(51) Int. Cl.
*G06T 7/73* (2017.01)
*A63F 13/57* (2014.01)
(Continued)

(52) U.S. Cl.
CPC ................ *G06T 7/73* (2017.01); *A63F 13/42* (2014.09); *A63F 13/57* (2014.09); *G06T 7/246* (2017.01);
(Continued)

(58) Field of Classification Search
CPC ............... G06F 3/011–015; A61F 4/00; H04L 29/06034; H04M 2203/359;
(Continued)

(56) References Cited

U.S. PATENT DOCUMENTS 7,197,126 B2  3/2007 Kanada
7,225,414 B1*  5/2007 Sharma .................. G06F 3/012
                                                      715/862

(Continued)

FOREIGN PATENT DOCUMENTS

JP    11-146978       6/1999
JP    2010-233671     10/2010
KR    1020100138827   12/2010

OTHER PUBLICATIONS

Korean Office Action dated Nov. 3, 2017 issued in counterpart application No. 10-2012-0003432, 9 pages.
(Continued)

*Primary Examiner* — Kenneth Bukowski
(74) *Attorney, Agent, or Firm* — The Farrell Law Firm, P.C.

(57) ABSTRACT

Provided are virtual space moving apparatus and method. A virtual space moving apparatus includes a 3D camera to capture real space; a display; and a processor to display a virtual space, implement a virtual object corresponding to an actual object in an actual space, and display virtual object at a specific position in virtual space, set a first detection area adjacent to an initial position of actual object and a second detection area spaced from initial position of actual object and surrounding first detection area, when actual object is moved by a first distance in first detection area outwards from initial position, move virtual object by first virtual movement distance, and when actual object is moved by first distance in second detection area outwards from a boundary between first detection area and second detection area, move
(Continued)

virtual object by a second virtual movement distance greater than first virtual movement distance.

12 Claims, 6 Drawing Sheets

(51) Int. Cl.
*A63F 13/42* (2014.01)
*G06T 7/246* (2017.01)

(52) U.S. Cl.
CPC ............... *G06T 2207/10028* (2013.01); *G06T 2207/20044* (2013.01)

(58) Field of Classification Search
CPC .... G05B 2219/32246; B60K 2370/177; B60K 2370/31
See application file for complete search history.

(56) References Cited

U.S. PATENT DOCUMENTS

| | | | |
|---|---|---|---|
| 8,384,665 | B1 | 2/2013 | Powers, III |
| 9,032,334 | B2* | 5/2015 | Yu ........................... G06F 3/017 715/849 |
| 2006/0119576 | A1* | 6/2006 | Richardson ............. G06F 3/012 345/156 |
| 2007/0222746 | A1 | 9/2007 | LeVine |
| 2010/0201693 | A1 | 8/2010 | Caplette et al. |
| 2010/0241998 | A1* | 9/2010 | Latta ....................... G06F 3/011 715/862 |
| 2011/0025603 | A1 | 2/2011 | Underkoffler et al. |
| 2011/0107216 | A1 | 5/2011 | Bi |
| 2011/0193939 | A1* | 8/2011 | Vassigh .................. G06F 3/011 348/46 |
| 2011/0227913 | A1 | 9/2011 | Hyndman |
| 2014/0104274 | A1* | 4/2014 | Hilliges ................. G06F 3/011 345/424 |

OTHER PUBLICATIONS

Mine, Virtual Environment Interaction Techniques, INC Chapel Hill computer science technical report TR95-018 (1995): 507248-2.

* cited by examiner

VIRTUAL SPACE MOVING APPARATUS AND METHOD

PRIORITY

This application claims priority under 35 U.S.C. § 120 to a U.S. patent application filed in the United States Patent and Trademark Office on Jan. 11, 2013 and assigned Ser. No. 13/739,693, which claims priority under 35 U.S.C. § 119(a) to a Korean Patent Application filed in the Korean Intellectual Property Office Jan. 11, 2012 and assigned Serial No. 10-2012-0003432, the contents of which are incorporated herein by reference.

BACKGROUND OF THE INVENTION

1. Field of the Invention

The present invention relates generally to a virtual space moving apparatus and method, and more particularly, to a virtual space moving apparatus and method in which a user can move as desired in a virtual space, regardless of the size of the space afforded to the user for the movement.

2. Description of the Related Art

A virtual reality system has now been developed, as the need has grown for a simulator that allows a user to experience real life in Three-Dimensional (3D) virtual reality identical to an actual situation. The virtual reality system may be used to provide high reality sensation in an electronically formed environment, such as in a virtual reality game or a 3D game.

The virtual reality system enables the user to feel sensory inputs, such as visual, auditory, and tactile senses, formed variously in a virtually created space. The sensory inputs may reproduce sensory experiences of a virtual world to provide various reality sensations.

When the user moves in a virtual environment, the real world is maximally implemented, but it may be more convenient to experience the virtual environment than the real world. A user in the virtual reality world can move between a space and the virtual space, unlike in the real world in which movement is made continuous over time.

For example, a virtual space apparatus including a 3D camera renders a user's 3D image output from the 3D camera into object data in a virtual space which is one-to-one size-mapped to a real space which is a user's motion space, and displays the object data on a screen. Thus, the user can move as desired in the virtual space.

As such, when the user moves in the virtual space in the conventional art, object data corresponds to the user moves, by a user's moving distance in the real space, in the virtual space which is one-to-one mapped to the real space.

However, due to the limited size of the real space in which the user can move, the user in the conventional art has difficulty moving as desired in the virtual space.

SUMMARY OF THE INVENTION

Accordingly, the present invention provides a virtual space moving apparatus and method that allows a user to move as desired in a virtual space without being limited by a real space in which the user can move.

According to an aspect of the present invention, there is provided a virtual space moving apparatus. The virtual space moving apparatus includes a three-dimensional (3D) camera configured to capture a real space; a display; and a processor; wherein the processor is configured to display a virtual space on the display, implement a virtual object corresponding to an actual object in an actual space, and display the virtual object at a specific position in the virtual space, set a first detection area adjacent to an initial position of the actual object and a second detection area spaced from the initial position of the actual object and surrounding the first detection area, when the actual object is moved by a first distance in the first detection area outwards from the initial position, move the virtual object by the first virtual movement distance, and when the actual object is moved by the first distance in the second detection area outwards from a boundary between the first detection area and the second detection area, move the virtual object by a second virtual movement distance greater than the first virtual movement distance.

According to another aspect of the present invention, there is provided a virtual space moving method in a virtual space moving apparatus. The virtual space moving method includes displaying a virtual space on a display, implementing a virtual object corresponding to an actual object in an actual space, and displaying the virtual object at a specific position in the virtual space, setting a first detection area adjacent to an initial position of an actual object and a second detection area spaced from the initial position of the actual object and surrounding the first detection area, when the actual object is moved by a first distance in the first detection area outwards from the initial position, moving the virtual object by the first virtual movement distance, and when the actual object is moved by the first distance in the second detection area outwards from a boundary between the first detection area and the second detection area, moving the virtual object by a second virtual movement distance greater than the first virtual movement distance.

BRIEF DESCRIPTION OF THE DRAWINGS

The above and other features and advantages of an embodiment of the present invention will be more apparent from the following detailed description taken in conjunction with the accompanying drawings, in which.

DETAILED DESCRIPTION OF EMBODIMENTS OF THE INVENTION

Hereinafter, embodiments of the present invention will be described in detail with reference to the accompanying drawings. In the following description and the accompanying drawings, well-known functions and structures will not be described for the sake of clarity and conciseness.

In the present invention, when a user moves in a state where a sensor-recognizable region of a 3D camera and a user motion region of a real space are identical, an object in a virtual space is moved based on accelerated-movement information of an accelerated-movement region corresponding to a user's position among a plurality of accelerated-movement regions which are previously set in the sensor-recognizable region, such that the user can freely move in the virtual space without being limited by a real space.

Figure 1:
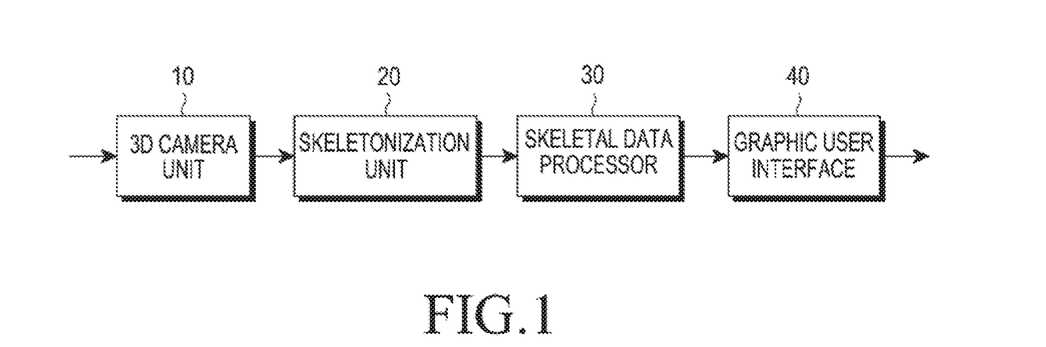
FIG. 1 is a structural diagram of a virtual space moving apparatus according to an embodiment of the present invention.

FIG. 1 is a structural diagram of a virtual space moving apparatus according to an embodiment of the present invention.

Referring to FIG. 1, the virtual space moving apparatus includes a 3D camera unit 10, a skeletonization unit 20, a skeletal data processor 30, and a Graphic User Interface (GUI) 40.

The 3D camera unit 10 converts a 3D image signal including 3D position information of x-axis, y-axis, and z-axis of a subject into a 3D image, and senses motion of the subject. The 3D image corresponds to the subject. The 3D camera unit 10 includes a depth camera, a multi-view camera, and a stereo camera. The subject (i.e., a user) is photographed and its motion is sensed using a 3D camera, but a plurality of 2D cameras may be used or the subject motion may be determined by further including and using a motion sensor. While the virtual space moving apparatus includes the 3D camera unit 10 in an embodiment of the present invention, the 3D image may be received from an external server via a wired or wireless communication unit or may have been stored in a memory embedded or inserted into the virtual space moving apparatus.

The sensor-recognizable region of the 3D camera unit 10 refers to a region that can be recognized and photographed by the 3D camera unit 10, and this region is the same as a user motion region in a real space.

The skeletonization unit 20 recognizes an outline of the subject, separates a subject region and a background region from the 3D image based on the recognized outline, and skeletonizes the subject region to generate skeletal data. The skeletonization unit 20 outputs a plurality of optical signals to the sensor-recognizable region of the 3D camera unit 10 and recognizes the outline of the subject by recognizing the optical signals received after those signals are reflected from the user. The skeletonization unit 20 may also recognize the outline of the subject by using a pattern.

After recognizing the outline of the subject, the skeletonization unit 20 separates the subject region and the background region from the 3D image based on the recognized outline, and skeletonizes the separated subject region to generate skeletal data (or image). In the present invention, skeletonization involves expressing an object with a fully compressed skeletal line for recognition of the object.

The skeletal data processor 30 generates object data corresponding to the generated skeletal image and outputs the generated object data to the GUI 40.

The skeletal data processor 30 determines whether an accelerated-movement mode for accelerated movement of mapped object data in the virtual space is selected. If the accelerated-movement mode is selected, the skeletal data processor 30 maps a plurality of previously set accelerated-movement regions around a position of the subject. If the subject's position is moved, the skeletal data processor 30 identifies an accelerated-movement region including the moved position of the subject among the plurality of previously set accelerated-movement regions.

More specifically, the skeletal data processor 30 determines in which one of the plurality of accelerated-movement regions is included position information of skeletal data, such as x-axis, y-axis, and z-axis coordinates. Herein, respective accelerated-movement regions are set in which object motion per subject motion is made at different movement ratios. For example, if a particular accelerated-movement region is set to have object motion per subject motion which has a movement ratio of 1:2, then the object is moved in the virtual space with motion of twice the subject motion.

The skeletal data processor 30 moves the object in the virtual space at a movement ratio previously set corresponding to the identified accelerated-movement region, and displays the moved object in the virtual space through the GUI 40, which maps and displays the object generated by the skeletal data processor 30 in the virtual space. The graphic user interface 40 also displays the object moved in the virtual space.

As such, the object is moved in the virtual space at a movement ratio of object motion in the virtual space corresponding to subject motion, allowing the user to move as desired in the virtual space without being limited by the real space.

Figure 2:
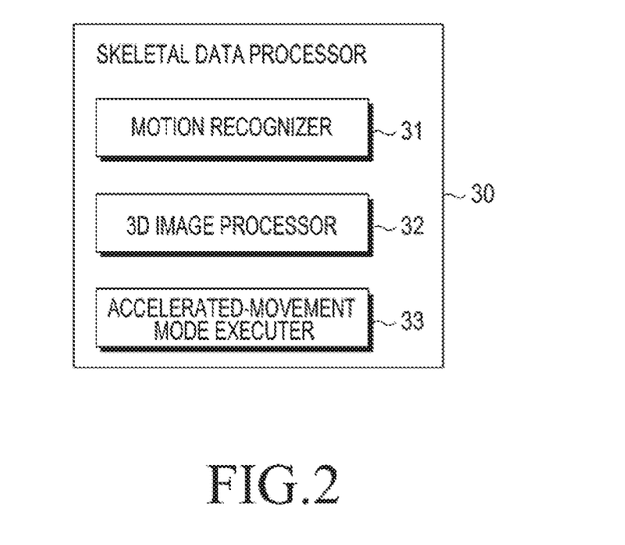
FIG. 2 is a detailed structural diagram of a skeletal data processor according to an embodiment of the present invention.

FIG. 2 is a detailed structural diagram of the skeletal data processor 30 according to an embodiment of the present invention.

Referring to FIG. 2, the skeletal data processor 30 includes a motion recognizer 31, a 3D image processor 32, and an accelerated-movement mode executer 33.

The motion recognizer 31 recognizes motion of a skeletal image corresponding to subject motion, which is input through the skeletonization unit 20. For example, the motion recognizer 31 recognizes position movement of the skeletal image or a gesture such as a hand motion. More specifically, the motion recognizer 31 extracts depth information of the moving subject through the 3D camera unit 10 such as a 3D camera, and segments the depth information. Thereafter, the motion recognizer 31 recognizes a 3D space position of a head, a 3D space position of a hand, and 3D space positions of torso and legs by using a structure of skeletal data regarding a human body, thus implementing interaction with 3D contents. Although user motion is recognized based on motion of the skeletal image in the embodiment of FIG. 2, user motion may also be recognized by a separate motion sensor.

The 3D image processor 32 generates object data corresponding to the skeletal data generated by the skeletonization unit 20, and maps the generated object data to a particular position in the virtual space. For example, the 3D image processor 32 generates object data, such as a user's avatar, in the virtual space, and maps the generated avatar to a position in the virtual space corresponding to the user's position in the real space.

Thereafter, when the accelerated-movement mode is executed, the 3D image processor 32 moves the position of the object data in the virtual space at the movement ratio identified by the accelerated-movement mode executer 33 corresponding to the subject motion.

The accelerated-movement mode executer 33 determines whether the motion recognized by the motion recognizer 31 is motion previously set for selection of the accelerated-movement mode, and executes the accelerated-movement mode or a normal mode according to a result of the determination. The normal mode is a default operation mode in the virtual space moving apparatus, in which the real space and the virtual space are one-to-one mapped and thus subject motion and object motion one-to-one correspond to each other.

More specifically, if the recognized motion is for selecting the accelerated-movement mode, the accelerated-movement mode executer 33 maps a plurality of previously set accelerated-movement regions around the position of the skeletal data. Thereafter, if movement of the position of the skeletal data is recognized by the motion recognizer 31, the accelerated-movement mode executer 33 identifies an accelerated-movement region including the moved position information of the skeletal data among the plurality of mapped accelerated-movement regions. In this state, the accelerated-movement regions are mapped around the position of the skeletal data in the sensor-recognizable region of the 3D camera unit 10.

The accelerated-movement mode executer 33 outputs a movement ratio of object motion per user motion, which is set corresponding to the identified accelerated-movement region, to the 3D image processor 32.

If the accelerated motion is not intended for selecting the accelerated-movement mode, i.e., is motion for movement in a distance, then the accelerated-movement mode executer 33 performs a normal mode in which object motion per subject motion is made at a movement ratio of 1:1.

As such, the present invention moves the object in the virtual space at a movement ratio of object motion in the virtual space, which is previously set corresponding to user motion, allowing the user to freely move as desired without being limited by the real space.

Figure 3:
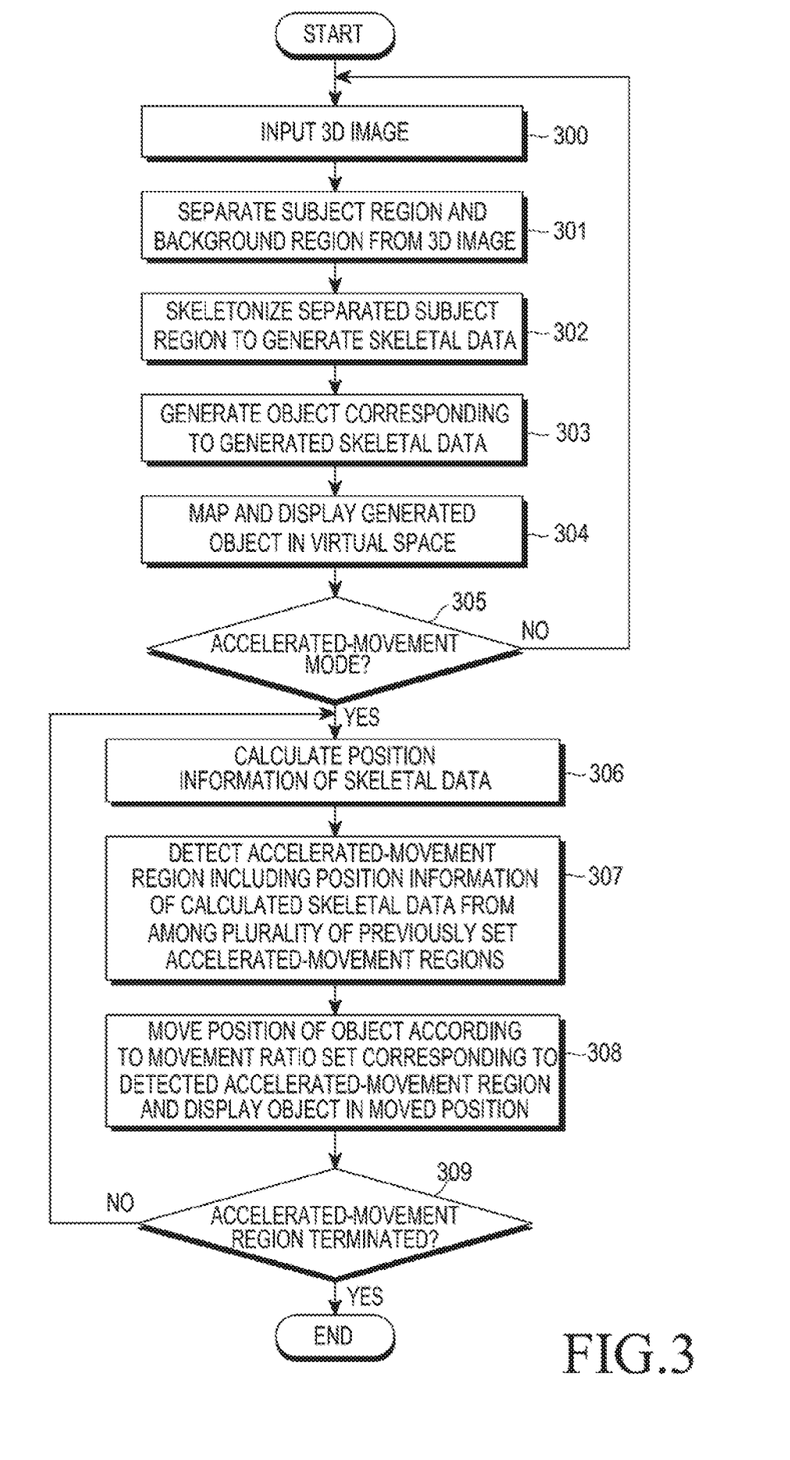
FIG. 3 illustrates a process for moving in a virtual space without being limited by a real space in a virtual space moving apparatus according to an embodiment of the present invention.

FIG. 3 illustrates a process for moving in the virtual space without being limited by the real space in the virtual space moving apparatus according to an embodiment of the present invention.

Upon input of a 3D image including x-axis, y-axis, and z-axis coordinates information of the subject through the 3D camera unit 10 in step 300, the skeletonization unit 20 recognizes the outline of the subject and separates a subject region and a background region from the 3D image based on the recognized outline in step 301. The skeletonization unit 20 outputs a plurality of optical signals to the sensor-recognizable region of the 3D camera unit 10 and recognizes the optical signals received after being reflected from the subject, thus recognizing the outline of the user.

The skeletonization unit 20 skeletonizes the separated subject region to generate skeletal data in step 302. In other words, the skeletonization unit 20, which has recognized the user's outline, separates the subject region and the background region from the 3D image based on the recognized outline, and generates the skeletal data by skeletonizing the separated subject region.

In step 303, the skeletal data processor 30 generates object data corresponding to the generated skeletal data.

In step 304, the skeletal data processor 30 maps the generated object data to a particular position in the virtual space and displays the generated object through the GUI 40.

In step 305, the skeletal data processor 30 determines whether the accelerated-movement mode is selected, and if the accelerated-movement mode is selected, the skeletal data processor 30 proceeds to step 306; otherwise, the skeletal data processor 30 returns to step 300 to continuously receive a 3D image and perform steps 301 through 305. More specifically, the process of determining whether the acceleration movement mode is selected involves determining at the skeletal data processor 30 whether the accelerated-movement mode for accelerated movement of the mapped object data in the virtual space is selected.

If the accelerated-movement mode is selected, the skeletal data processor 30 calculates position information of the skeletal data in step 306. More specifically, the skeletal data processor 30 maps the plurality of previously set accelerated-movement regions around the position of the subject, and if the position of the skeletal data is moved, the skeletal data processor 30 calculates the moved position information of the skeletal data.

In step 307, the skeletal data processor 30 detects an accelerated-movement region including the moved position information of the subject from the plurality of previously set accelerated-movement regions. Specifically, the skeletal data processor 30 determines in which one of the plurality of accelerated-movement regions is included the position information of the skeletal data, such as x-axis, y-axis, and z-axis coordinates, in correspondence to the motion of the subject.

In step 308, the skeletal data processor 30 moves the object in the virtual space at a movement ratio previously set corresponding to the detected accelerated-movement region, and displays the moved object in the virtual space through the GUI 40.

In step 309, the skeletal data processor 30 determines whether the accelerated-movement mode is terminated. If the accelerated-movement mode is terminated, the skeletal data processor 30 ends the process, otherwise, the skeletal data processor 30 returns to step 306 to calculate the position information of the skeletal data and performs steps 307 through 309.

As such, the object in the embodiment of FIG. 3 is moved in the virtual space at a previously set movement ratio of object motion in the virtual space corresponding to user motion, allowing the user to move as desired in the virtual space without being limited by the real space.

FIGS. 4 through 8 are diagrams for describing a process for movement in the virtual space without being limited by the real space by the virtual space moving apparatus according to an embodiment of the present invention.

Figure 4:
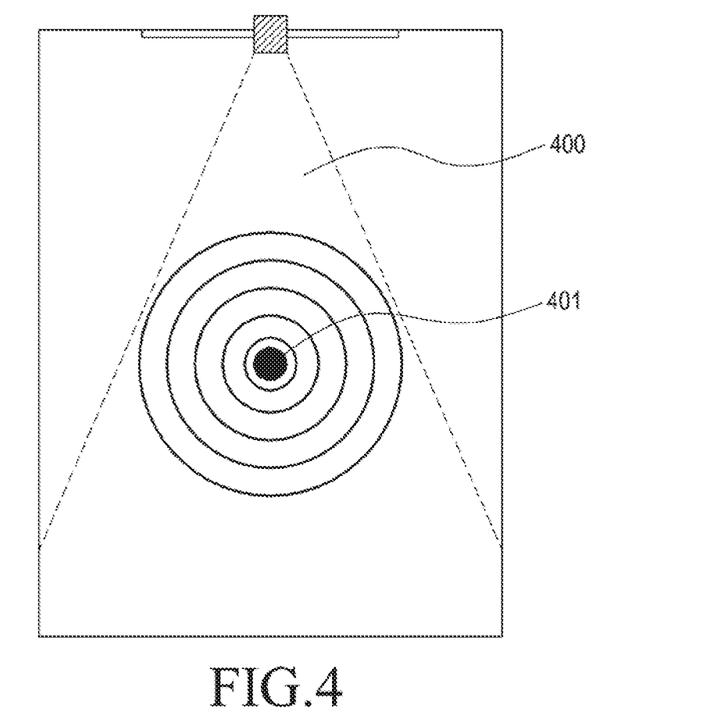
FIG. 4 illustrates a process for mapping a plurality of accelerated-movement regions in a sensor-recognizable region in an accelerated-movement mode according to an embodiment of the present invention.

FIG. 4 illustrates a process for mapping the plurality of accelerated-movement regions in the sensor-recognizable region in the accelerated-movement mode according to an embodiment of the present invention.

As shown in FIG. 4, assuming that a sensor-recognizable region 400 of the 3D camera unit 10 is identical to a subject motion space, the skeletal data processor 30 maps a plurality of accelerated-movement regions 401 around a position of the subject in the accelerated-movement mode.

Figure 5:
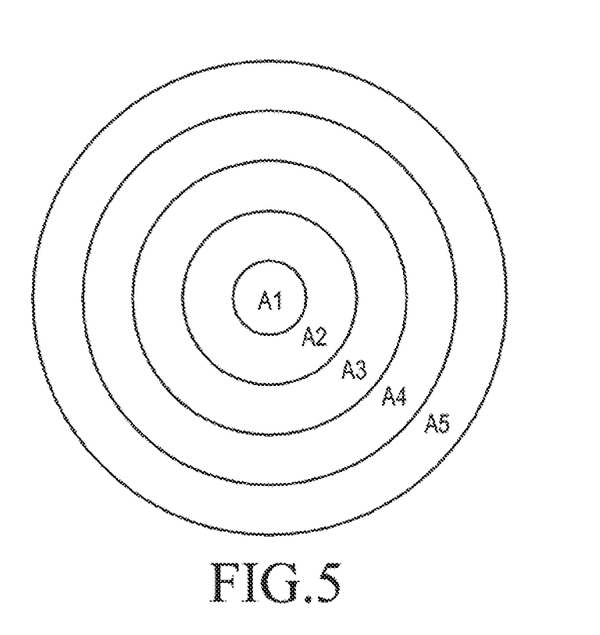
FIG. 5 illustrates a plurality of accelerated-movement regions according to an embodiment of the present invention.

FIG. 5 illustrates the plurality of accelerated-movement regions according to an embodiment of the present invention.

As shown in FIG. 5, there are five accelerated-movement regions: A1, A2, A3, A4, and A5. Although the plurality of accelerated-movement regions includes the 5 regions, it may also include n regions, where n>0.

The plurality of accelerated-movement regions may be set as shown below in Table 1.

TABLE 1

| Accelerated-Movement Region | Set Value |
| --- | --- |
| A1 | Object motion per subject motion has a movement ratio of 1:n |
| A2 | Object motion per subject motion has a movement ratio of 1:2n |
| A3 | Object motion per subject motion has a movement ratio of 1:7n |
| A4 | Object motion per subject motion has a movement ratio of 1:30n |
| A5 | Object motion per subject motion has a movement ratio of 1:100n |

Referring to Table 1 and FIGS. 6 and 7, the accelerated-movement mode will be described in detail.

Figure 6:
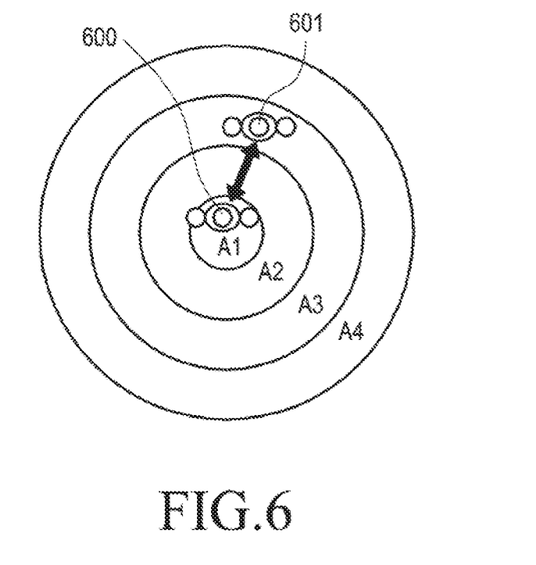
FIG. 6 illustrates a process in which an object moves in a virtual space corresponding to user motion according to an embodiment of the present invention.

FIG. 6 illustrates a process in which the object moves in the virtual space corresponding to user motion according to an embodiment of the present invention.

For example, when a user 600 is situated in the accelerated-movement region A1 and moves to a position 601, the skeletal data processor 30 may identify position information of the user 601, that is, position information of skeletal data and determine in which one of the plurality of accelerated-movement regions the position information is included. In other words, the skeletal data processor 30 determines in which one of A1 through A4 x-axis, y-axis, and z-axis coordinates of the skeletal data are included.

Upon determining that the position of the user 601 is included in the accelerated-movement region A3, the skeletal data processor 30 moves an object in the virtual space at a movement ratio of 1:7n for object motion per user motion as set in Table 1.

Figure 7:
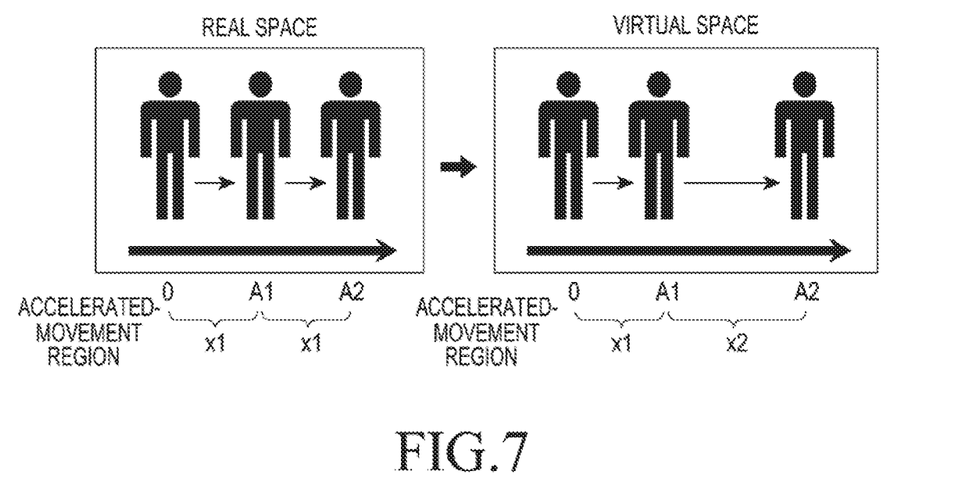
FIG. 7 illustrates object motion in a virtual space corresponding to user motion in a real space according to an embodiment of the present invention.

FIG. 7 illustrates object motion in the virtual space corresponding to user motion in the real space according to an embodiment of the present invention.

For example, if the user moves at a movement ratio of 1:1 from the accelerated-movement region A1 to the accelerated-movement region A2 in the real space, the object may move at a previously set movement ratio of 1:2 in the virtual space.

Figure 8:
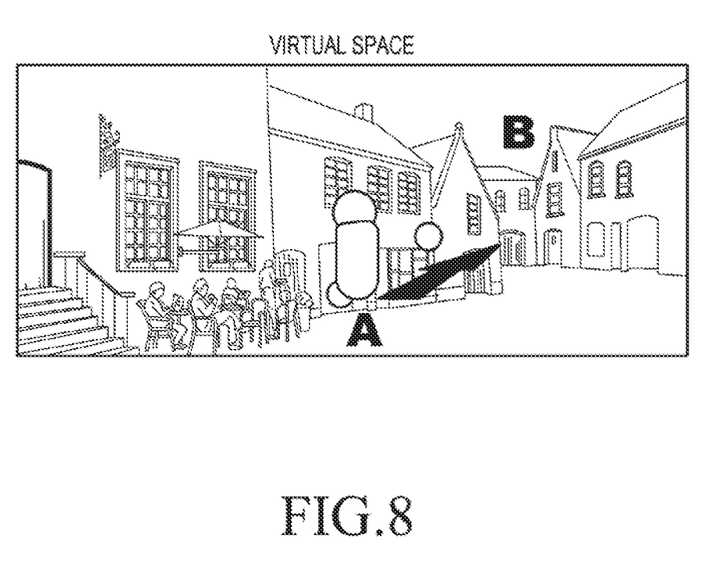
FIG. 8 illustrates movement in a virtual space according to an embodiment of the present invention.

FIG. 8 illustrates movement in the virtual space according to an embodiment of the present invention.

As the user moves a particular distance in the real space, the object in the virtual space moves from a position A to a position B, as shown in FIG. 8, regardless of a size or a form of the real space.

Figure 9:
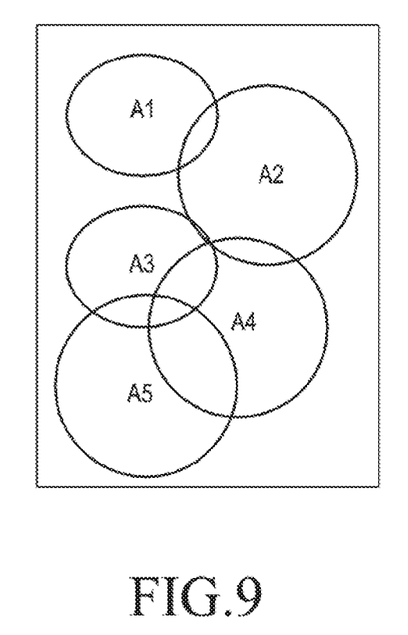
FIGS. 9 and 10 illustrate forms of a plurality of accelerated-movement regions according to an embodiment of the present invention.
Figure 10:
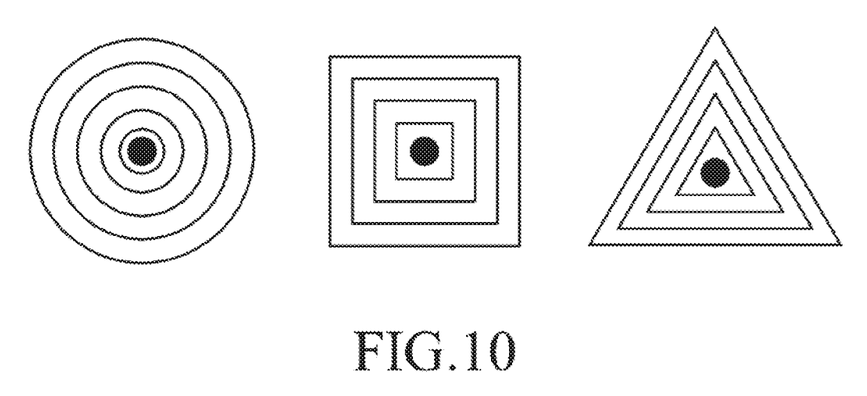

FIGS. 9 and 10 illustrate forms of the plurality of accelerated-movement regions according to an embodiment of the present invention.

While the virtual space is implemented in a circular form in an embodiment of the present invention, it may also be configured in a form shown in FIG. 9 and may be configured in circular, rectangular, or triangular forms as shown in FIG. 10.

Therefore, the present invention moves the object in the virtual space at a previously set movement ratio of object motion in the virtual space corresponding to user motion, allowing the user to move as desired in the virtual space without being limited by the real space.

Moreover, according to the present invention, an object moves an accelerated-movement distance corresponding to an accelerated-movement region previously set corresponding to user motion in a virtual space, such that a user can move anywhere as desired in the virtual space, regardless of a size of a real space.

It can be seen that the embodiment of the present invention can be implemented with hardware, software, or a combination of hardware and software. Such arbitrary software may be stored, whether or not erasable or re-recordable, in a volatile or non-volatile storage such as a Read-Only Memory (ROM), a memory such as a Random Access Memory (RAM), a memory chip, a device, or an integrated circuit, and an optically or magnetically recordable and machine (e.g., computer)-readable storage medium such as a Compact Disc (CD), a Digital Versatile Disk (DVD), a magnetic disk, or a magnetic tape. The virtual space moving method according to the present invention can be implemented by a computer or a portable terminal which includes a controller and a memory, and it can be seen that a storing unit may be an example of a non-transitory machine-readable storage medium which is suitable for storing a program or programs including instructions for implementing the embodiment of the present invention. Therefore, the present invention includes a program including codes for implementing an apparatus or method claimed in an arbitrary claim and a machine-readable storage medium for storing such a program. The program may be electronically transferred through an arbitrary medium such as a communication signal delivered through wired or wireless connection, and the present invention properly includes equivalents thereof.

The present invention is not limited by the foregoing embodiments and the accompanying drawings because various substitutions, modifications, and changes can be made by those of ordinary skill in the art without departing from the technical spirit of the present invention.

What is claimed is:

1. A virtual space moving apparatus, comprising:
a three-dimensional (3D) camera configured to capture a real space;
a display; and
a processor;
wherein the processor is configured to:
control the display to display a virtual space on the display,
identify an entire user using the 3D camera,
implement a virtual object corresponding to the entire user, the virtual object being configured to be moved in the virtual space when the entire user moves in an actual space,
display the virtual object at a specific position in the virtual space,
set a plurality of detection areas based on an initial position of the entire user, wherein the plurality of detection areas comprises a first circular detection area comprising a center point corresponding to the initial position of the entire user and a second detection area comprising an outline spaced a predetermined distance from the center point of the first circular detection area,
when the entire user moves by a first distance in the first circular detection area outwards from the initial position, move the virtual object by a first virtual movement distance in the virtual space, and
when the entire user moves by the first distance in the second detection area outwards from an outline comprised in the first circular detection area, move the virtual object by a second virtual movement distance greater than the first virtual movement distance in the virtual space,
wherein the plurality of detection areas are set to have different movement ratios, and as a distance away from the center point increases, a movement ratio set in each of the plurality of detection areas increases.

2. The virtual space moving apparatus of claim 1, wherein a maximum movement distance of the virtual object in the virtual space when a first mode is selected is greater than a maximum movement distance of the virtual object in the virtual space when a second mode is selected.

3. The virtual space moving apparatus of claim 1, wherein a movement distance of the virtual object per unit time in the display is greater than a movement distance of the entire user per unit time when a first mode is selected.

4. The virtual space moving apparatus of claim 1, wherein the processor is further configured to:
generate skeletal data by skeletonizing the entire user from the captured actual space, and generate the virtual object based on the skeletal data.

5. The virtual space moving apparatus of claim 4, wherein the processor is further configured to:
detect that the entire user moves by detecting a change of the skeletal data.

6. The virtual space moving apparatus of claim 1, wherein the processor is further configured to:
when a first mode is selected, move the virtual object in the virtual space by a movement distance of the entire user in the real space.

7. A virtual space moving method in a virtual space moving apparatus, the virtual space moving method comprising:
displaying a virtual space on a display;
identifying an entire user using a 3D camera;
implementing a virtual object corresponding to the entire user, the virtual object being configured to be moved in the virtual space when the entire user moves in an actual space;
displaying the virtual object at a specific position in the virtual space;
setting a plurality of detection areas based on an initial position of the entire user, wherein the plurality of detection areas comprises a first circular detection area comprising a center point corresponding to the initial position of the entire user and a second detection area comprising an outline spaced a predetermined distance from the center point;
when the entire user moves by a first distance in the first circular detection area outwards from the initial position, moving the virtual object by a first virtual movement distance in the virtual space; and
when the entire user moves by the first distance in the second detection area outwards from an outline comprised in the first circular detection area, moving the virtual object by a second virtual movement distance greater than the first virtual movement distance in the virtual space,
wherein the plurality of detection areas are set to have different movement ratios, and as a distance away from the center point increases, a movement ratio set in each of the plurality of detection areas increases.

8. The virtual space moving method of claim 7, wherein a maximum movement distance of the virtual object in the virtual space when a first mode is selected is greater than a maximum movement distance of the virtual object in the virtual space when a second mode is selected.

9. The virtual space moving method of claim 7, wherein a movement distance of the virtual object per unit time in the display is greater than a movement distance of the entire user per unit time when a first mode is selected.

10. The virtual space moving method of claim 7, further comprising:
generating skeletal data by skeletonizing the entire user from the captured actual space, and generating the virtual object based on the skeletal data.

11. The virtual space moving method of claim 10, further comprising:
detecting that the entire user moves by detecting a change of the skeletal data.

12. The virtual space moving method of claim 7, further comprising:
when a first mode is selected, moving the virtual object in the virtual space by a movement distance of the entire user in the real space.

* * * * *